United States Patent
Buschmann et al.

(10) Patent No.: US 12,314,730 B2
(45) Date of Patent: May 27, 2025

(54) COMPUTER IMPLEMENTED METHOD AND DISTRIBUTED COMPUTING INFRASTRUCTURE FOR AUTOMATED PLUG AND PLAY CONFIGURATION

(71) Applicant: Siemens Aktiengesellschaft, Munich (DE)

(72) Inventors: Frank Buschmann, Munich (DE); Lars Gelbke, Mansfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 223 days.

(21) Appl. No.: 17/835,443

(22) Filed: Jun. 8, 2022

(65) Prior Publication Data
US 2022/0398106 A1  Dec. 15, 2022

(30) Foreign Application Priority Data
Jun. 9, 2021 (EP) .................................... 21178475

(51) Int. Cl.
*G06F 9/4401* (2018.01)
*H04L 9/40* (2022.01)

(52) U.S. Cl.
CPC ........ *G06F 9/4413* (2013.01); *H04L 63/0823* (2013.01)

(58) Field of Classification Search
CPC .. G06F 9/4413; G06F 9/4411; G06F 9/44505; G06F 9/5077; G06F 15/161; G06F 15/177; H04L 63/0823; H04L 61/5014

USPC .................................................... 726/6
See application file for complete search history.

(56) References Cited

U.S. PATENT DOCUMENTS

| | | | |
|---|---|---|---|
| 8,392,712 B1 * | 3/2013 | Wilson | H04L 63/08 713/175 |
| 10,935,855 B2 | 3/2021 | Waldie | H04L 29/06 |
| 2007/0268516 A1 | 11/2007 | Bugwadia | 358/1.15 |
| 2010/0142410 A1 * | 6/2010 | Huynh Van | H04L 12/4641 370/255 |

(Continued)

OTHER PUBLICATIONS

Search Report for EP Application No. 21178475.6, 15 pages, Dec. 13, 2021.

*Primary Examiner* — Jacob Lipman
(74) *Attorney, Agent, or Firm* — Slayden Grubert Beard PLLC

(57) ABSTRACT

Various embodiments of the teachings herein include a computer-implemented method for automated configuration of a joining computing device into a computing system. The method may include: using a device management service to listen for messages from joining devices; connecting via secure shell and factory default credentials to a discovered device; configuring the joining device based on device descriptions, including: downloading a description from the joining device; creating new security certificates which enable secure communication; closing the default ssh services and triggering a reboot; reading the description from the joining device; using the description to identify the set of connectors required for the container runtime environment to be deployed; and receiving into and executing containerized software in a deployed container runtime environment on the joining computer device.

7 Claims, 4 Drawing Sheets

(56) References Cited

U.S. PATENT DOCUMENTS

2013/0318343 A1* 11/2013 Bjarnason ........... H04L 41/0809
　　　　　　　　　　　　　　　　　　　　　　　　　713/157
2017/0148018 A1* 5/2017 Levin ................... G06Q 20/202
2020/0162330 A1* 5/2020 Vadapalli ................ H04L 41/12

* cited by examiner

COMPUTER IMPLEMENTED METHOD AND DISTRIBUTED COMPUTING INFRASTRUCTURE FOR AUTOMATED PLUG AND PLAY CONFIGURATION

CROSS-REFERENCE TO RELATED APPLICATIONS

This application claims priority to EP Application No. 21178475.6 filed Jun. 9, 2021, the contents of which are hereby incorporated by reference in their entirety.

TECHNICAL FIELD

The present disclosure relates to computer systems. Various embodiments of the teachings herein may include computer-implemented methods and/or distributed computing infrastructures for automated plug and play configuration of a joining computing device into a computing system.

BACKGROUND

Modern operation and control systems or Internet of things (IoT) networks face requirements for continuous evolution and exchange of computing devices, such as controllers, edge devices and intelligent field devices. For instance, adding, removing and replacing computing devices paired with a flexible deployment and resource optimized scheduling of software on these computing devices is a common key scenario.

There are two standard approaches to address this scenario, both with significant drawbacks. In each case a basic network and security setup is mandatory. Operators must connect to the new device, for example via laptop or a pre-prepared USB device, to do the initial network configuration like network address and/or WIFI connection settings. Further, a secure communication must be established by creating or re-using certificates.

In a manual engineering approach then, new devices are manually configured, for example with an appropriate container runtime environment. Part of this environment configuration, in particular, is the development and/or integration of custom drivers to access the device compute resources, such as field-programmable gate arrays (FPGAs), Input-Output-interfaces/devices/channels (IOs), and its supported communication protocols. Manual engineering is tedious and error prone and thus inefficient and costly.

In a device pre-configuration approach, the device manufacturers often pre-configure their devices with a container runtime environment so that they are ready for software deployment once they are integrated with a concrete operation and control system or IoT network. Such an approach works well in homogeneous scenarios where all devices are from the same vendor or where the devices of all vendors use a standard container runtime environment. However, this approach prevents the integration of devices into a system that natively are not equipped with a container runtime. Similarly, the use of a standardized runtime may not allow to use device-specific compute capabilities, such as an FPGA, or to use communication protocols not supported by the standard container runtime environment.

SUMMARY

The teachings of the present disclosure describe computer implemented methods which may overcome the above-mentioned disadvantages. In particular embodiments, a distributed computing infrastructure performs one or more of the methods described herein. For example, some embodiments of the teachings herein include a computer-implemented method comprising an automated (plug and play) configuration and/or integration of a joining computing device (10) into a computing system with the measures: a device management service (1) listening in a local distributed computing infrastructure (20, 30) for broadcasting messages (24) of joining computing devices (10), the device management service (1) automatically connecting via ssh and factory default credentials to a discovered joining computing device (10), automated device configuration of the joining computing device (10) based on computer readable device descriptions (14), comprising the steps: the device management service (1) downloading a device description (14) from the joining computing device (10), the device management service (1) creating new security certificates (sec) for the joining computing device (10), which enable secure communication, the device management service (1) closing the default ssh services on the joining computing device (10) and triggering a reboot of the joining computing device (10), the device management service (1) reading the device description (14) from the joining computing device (10), the device management service (1) using the device description information (14) to identify the set of connectors (23) that are required for the container runtime environment (21) to be deployed on the joining computing device (10), and receiving into and executing containerized software in a deployed container runtime environment (21) on the joining computer device (10).

In some embodiments, the automated configuration further comprises the measure, the device management service (1) obtaining the required connectors (23) of the container runtime environment (21) to the device's capabilities, wherein the device management service (1) checks the system level repository for pre-defined connectors (23).

In some embodiments, the pre-defined connectors (23) connect to communication protocols and/or to hardware like sensors and/or FPGAs.

In some embodiments, the automated configuration further comprises the measure, the device management service (1) automatically generating the required connector (23).

In some embodiments, the generation of the required connector (23) is based on the device description information (14).

In some embodiments, the created security certificates (sec) are user-specific.

In some embodiments, the device description (14) from the joining computing device (10) comprises its hardware (12) and software setup information.

In some embodiments, there is a computing device (10) comprising a container runtime environment (21) or able to receive a software package of the container runtime environment (21), with that, able to receive and execute containerized software, a minimal firmware (13) to boot the system into a broadcasting mode (24), a LAN port (15) which uses DHCP to get a network address, a computer readable device description (14) that specifies capabilities of the computing device (10), and an open sshd package (sshd) that accepts connection requests via default credentials.

In some embodiments, the computer readable device description (14) specifies compute resources like CPU, RAM, FPGAs, I/Os, integrated sensors, and/or software.

In some embodiments, the computer readable device description (14) specifies communication protocol software.

As another example, some embodiments include a computing system comprising: a device manager (1) for discover, connection to, and access to joining computing devices (10), further comprising a binary repository (2) containing at least a software package of the container runtime environment (21) to be deployed on a joining computing device (10).

In some embodiments, the device manager (1) comprises a dashboard (11).

As another example, some embodiments include a distributed computing infrastructure comprising at least a computing device (10) and a computing system as described herein, further comprising computing nodes, network participants and modules.

As another example, some embodiments include a computer program product comprising instructions which, when the program is executed by a computer system, cause the computer system to carry out the steps of one or more of the methods as described herein.

As another example, some embodiments include a provision apparatus for the computer program product as described herein, wherein the provision apparatus stores and/or provides the computer program product.

BRIEF DESCRIPTION OF THE DRAWINGS

The above and other elements, features, steps, and characteristics of the present disclosure will be more apparent from the following detailed description of embodiments with reference to the following figures.

DETAILED DESCRIPTION

Figure 1:
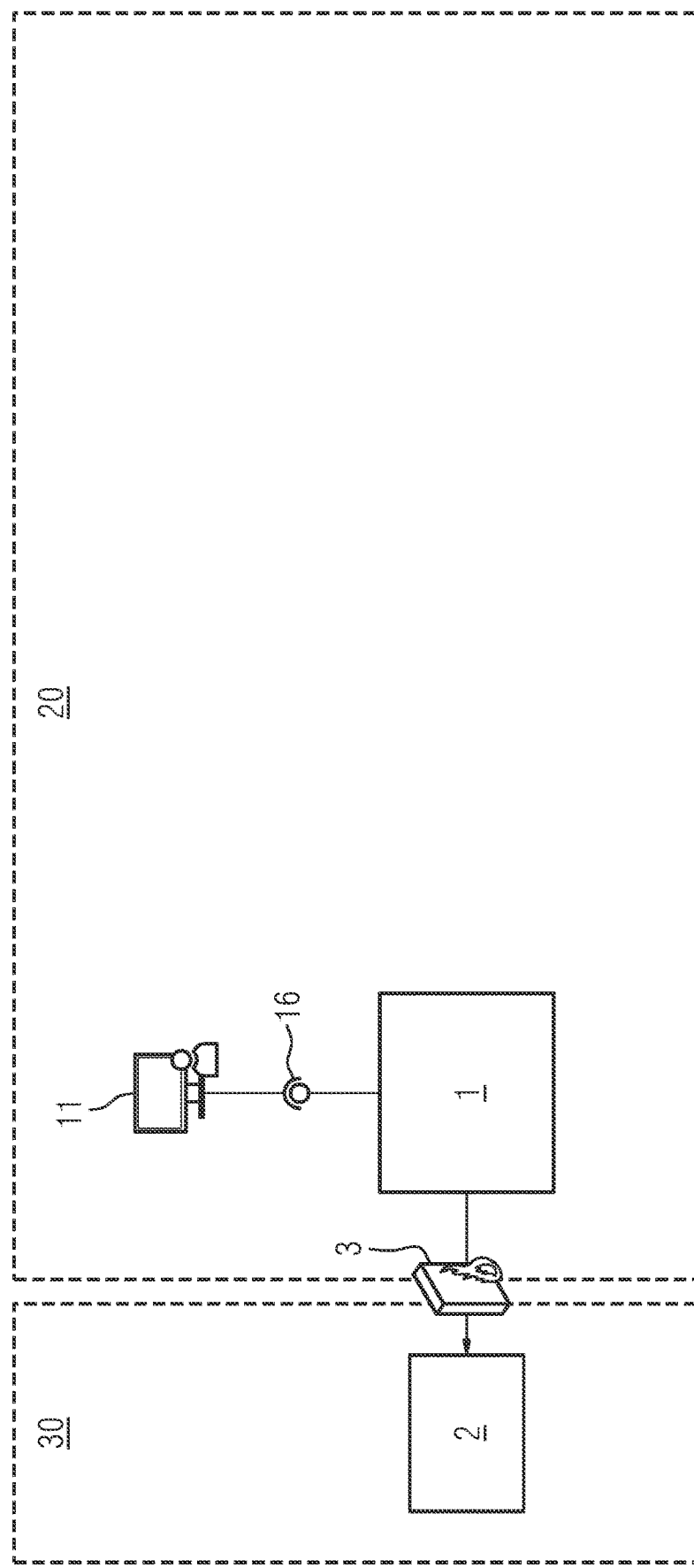
FIG. 1 illustrates a schematic drawing of a computing system incorporating teachings of the present disclosure, with focus on the requirements at system level.

The present disclosure describes computer-implemented methods, comprising an automated configuration, in particular a plug and play integration of a joining computing device into a computing system with the measures: a device management service listening in a local distributed computing infrastructure for broadcasting messages of joining computing devices, the device management service automatically connecting via Secure Shell Protocol (ssh, a cryptographic network protocol for operating network services securely over an unsecured network) and factory default credentials to a discovered joining computing device, automated device configuration of the joining computing device based on computer readable device descriptions, comprising the steps: the device management service downloading a device description from the joining computing device, the device management service creating new security certificates for the joining computing device, which enable secure communication, the device management service closing the default ssh services on the joining computing device and triggering a reboot of the joining computing device, the device management service reading the device description from the joining computing device, the device management service using the device description information to identify the set of connectors that are required for the container runtime environment to be deployed on the joining computing device, receiving into and executing containerized software in a deployed container runtime environment on the joining computer device.

The methods and system described herein may allow adding, removing and replacing process of computing devices paired with a flexible deployment and redeployment, resource optimized scheduling and rescheduling of software on these computing devices within a network, in particular concerning an Open Process Architecture Forum (OPAF). The methods may include configuring new computing devices with a container runtime environment to execute containerized software applications that are subsequently deployed to the computing devices.

In some embodiments, the automated configuration advantageously further comprises the measure, the device management service obtaining the required connectors of the container runtime environment to the device's capabilities, wherein the device management checks the system level repository for pre-defined connectors. In some embodiments, the pre-defined connectors connect to communication protocols and/or to hardware like sensors and/or FPGAs.

In some embodiments, the automated configuration further comprises the measure, the device management service automatically generating the required connector. In some embodiments, the generation of the required connector, in particular is based on the device description information. Automatic connector generation is generally possible for all mapping tasks, such as communication protocol adaptation, in particular field communication protocols, for example from the container runtime communication protocol to Profibus (Process Field Bus, standard for fieldbus communication in automation technology) or HART Communication Protocol (Highway Addressable Remote Transducer, a hybrid analog and digital industrial automation open protocol), or data format mappings, e.g., from the data formats used by containerized apps to the data formats required by the sensors and IOs of the device. For example, using tools like Ansible and Puppet, the device management service configures the container runtime environment with the required connectors, and uploads to and installs it on, the device.

In some embodiments, the device manager downloads and installs a node client on the device so that it can be monitored by the device management service of the system. In some embodiments, the created security certificates are user-specific. A user for example is a shopfloor-owner. In particular, the device description from the joining computing device comprises its hardware and software setup information.

In conclusion, a zero-touch bootstrapping process is provided, based on a broadcasting concept. Paired with the default factory credentials, the device manager can bootstrap the device without any additional human interaction. The user must not connect to the device via a laptop or a pre-created USB device to start the bootstrapping process. Device specific tailored bootstrapping is based on the device description. The device manager will prepare and deploy a perfectly matching, basic software stack including a container-runtime, connectors, a node-client and secured communication tools.

In some embodiments, a computing device comprises a container runtime environment or able to receive a software package of the container runtime environment, with that, able to receive and execute containerized software, a minimal firmware to boot the system into a broadcasting mode, a local area network (LAN) port which uses Dynamic Host Configuration Protocol (DHCP, a network management protocol used on Internet Protocol networks) to get a network address, a computer readable device description that specifies capabilities of the computing device, an open sshd package that accepts connection requests via default credentials.

In some embodiments, the computing device comprises the computer readable device description, that specifies compute resources like CPU, RAM, FPGAs, IOs, integrated sensors, and/or software. In an alternative embodiment, the computing device comprises a computer readable device description that specifies communication protocol software.

In some embodiments, a computing system comprises a device manager for discover, connection to, and access to joining computing devices, and further comprising a binary repository containing at least a software package of the container runtime environment to be deployed on a joining computing device. In particular, the device manager deploys the device management service according to one of the embodiments of the method according to the invention. In some embodiments, the device manager comprises a dashboard. The binary repository may be located separately from the local net 20, for example in the internet or in an on-premise cloud.

In some embodiments, a distributed computing infrastructure comprises at least a computing device and a computing system as described above, further comprising computing nodes, network participants and modules.

In some embodiments, a computer program product comprises instruction, in particular program code. The instructions are executable by at least one processor. When the program is executed by a computer system, the computer system carries out the steps of one or more of the methods as described above. Meaning, executing the program code causes the at least one processor to perform one of the methods for an automated plug and play configuration and/or integration of a joining computing device into a computing system. In some embodiments, a provision apparatus for the aforementioned computer program product stores and/or provides the computer program product.

Although specific features described in the above summary and the following detailed description are described in connection with specific embodiments and aspects of the present disclosure, it should be understood that the features of the exemplary embodiments and aspects may be combined with each other, and correlate to each other, unless specifically noted otherwise. Therefore, the above summary is merely intended to give a short overview over some features of some embodiments and implementations and is not to be construed as limiting. Other embodiments may comprise other features than the ones explained above.

The teachings herein allow digitalization even of installed (legacy) base. Today's installed controllers and intelligent field devices are not yet equipped with container runtimes. Yet, most of them run a Linux Operating System or offer a POSIX interface. Device descriptions in EDD or OPC-UA are generally available. The devices are also often connected to (internal) networks, e.g., via Profinet. In this case, it is possible to create and deploy tailored container runtimes for these devices to make them digitalization ready.

DETAILED DESCRIPTION

In the following, various embodiments of the teachings herein are described in detail with reference to the accompanying drawings. It is to be understood that the description of embodiments is not to be taken in a limiting sense. The drawings are taken to be illustrative only. The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, modules or other physical or functional units shown in the drawings or described herein may also be implemented by a direct or indirect, connection or coupling. A coupling between components may be established wired or over a wireless connection. Functional blocks, computing devices, nodes or entities may be implemented in hardware, firmware, software, or a combination thereof.

Teachings of the present disclosure address the challenge of device configuration with a container runtime environment by means of automating the entire process based on computer readable device descriptions. To realize an automatic container runtime environment configuration preconditions are required at system and device level.

FIG. 1 illustrates the requirements at system level. A computing system, into which computing devices can be integrated, provides at least two services. First, a device manager 1, in particular including a dashboard 11, to discover, connect to, and access computing devices that newly join the computing system's network. Second, a binary repository 2 that contains software packages of the container runtime environment to be deployed on computing devices 10. The binary repository 2 is preferably located separately from the local net 20, for example in the internet or in an on-premise cloud 30.

Figure 2:
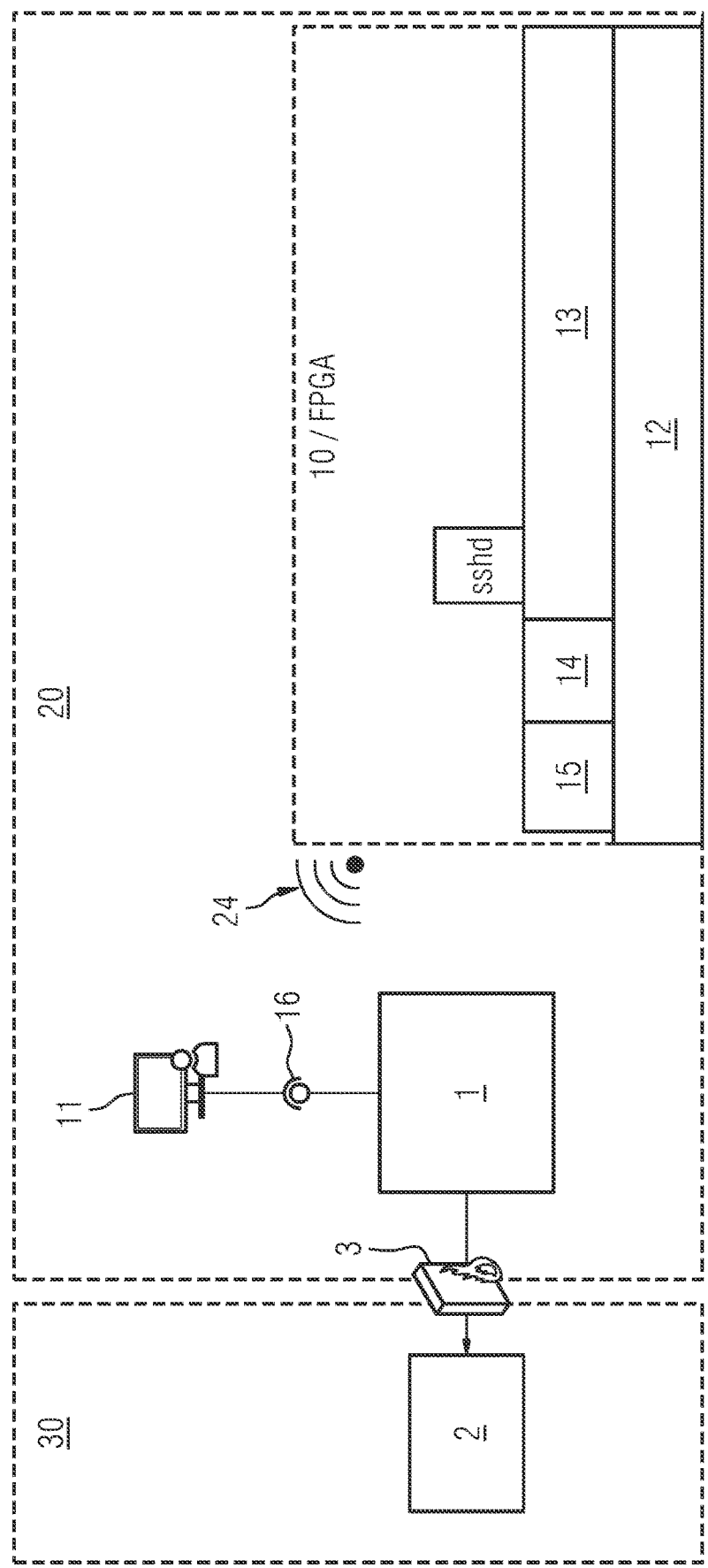
FIG. 2 illustrates a schematic drawing of a computing system incorporating teachings of the present disclosure, with focus on the requirements at device level.

FIG. 2 illustrates the requirements at device level. Computing devices 10 to be integrated into a computing system require the following characteristics: A minimal firmware 13 to boot the computing device 10 into a broadcasting mode, a LAN port 15 which for example uses DHCP to get a network address, a computer readable device description 14 that specifies all capabilities of the computing device 10, such as compute resources like CPU, RAM, FPGAs, IOs, integrated sensors, and software, such as communication protocols. An open sshd package (sshd) accepts connection requests via default credentials.

Figure 3:
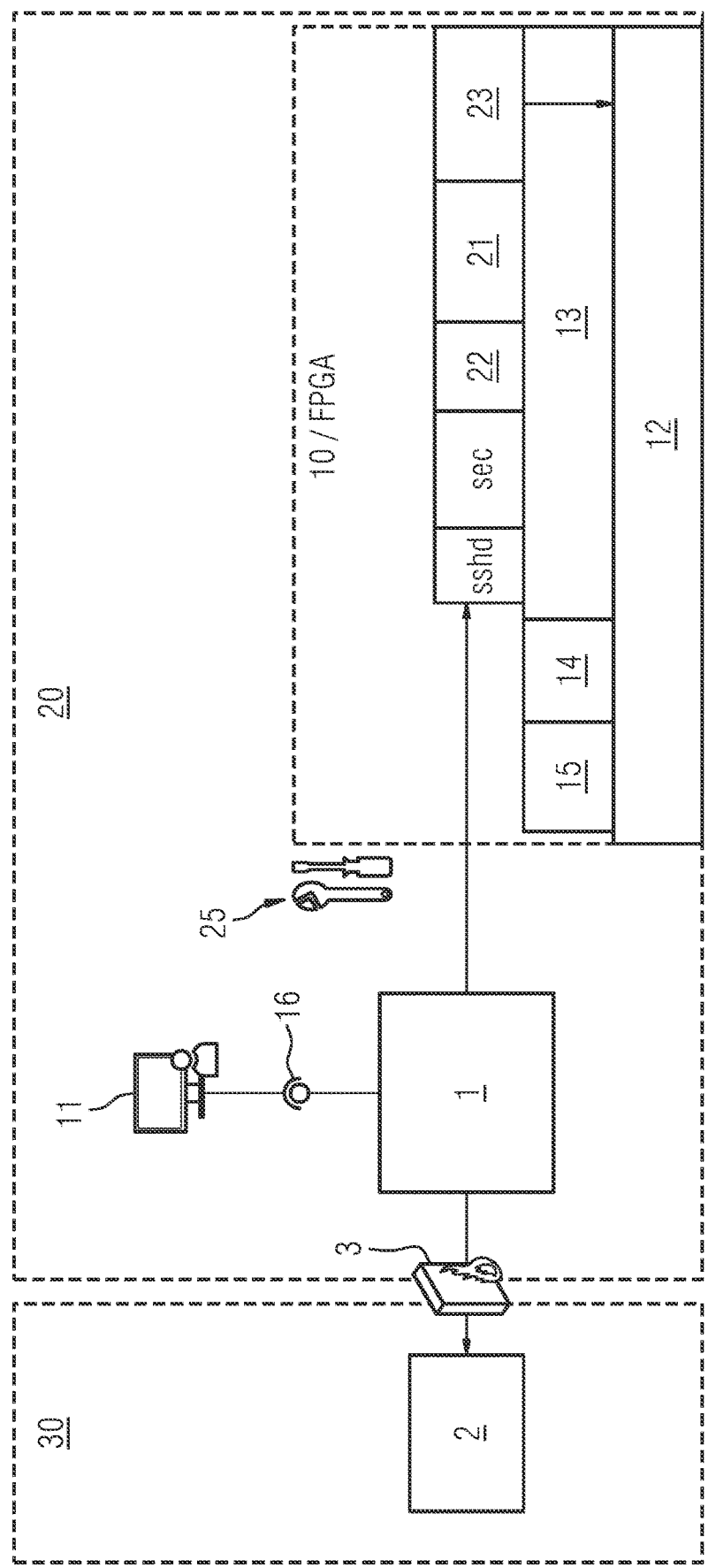
FIG. 3 illustrates relevant modules and services for an automatic configuration of the container runtime environment 21 for a computing device 10.
Figure 4:
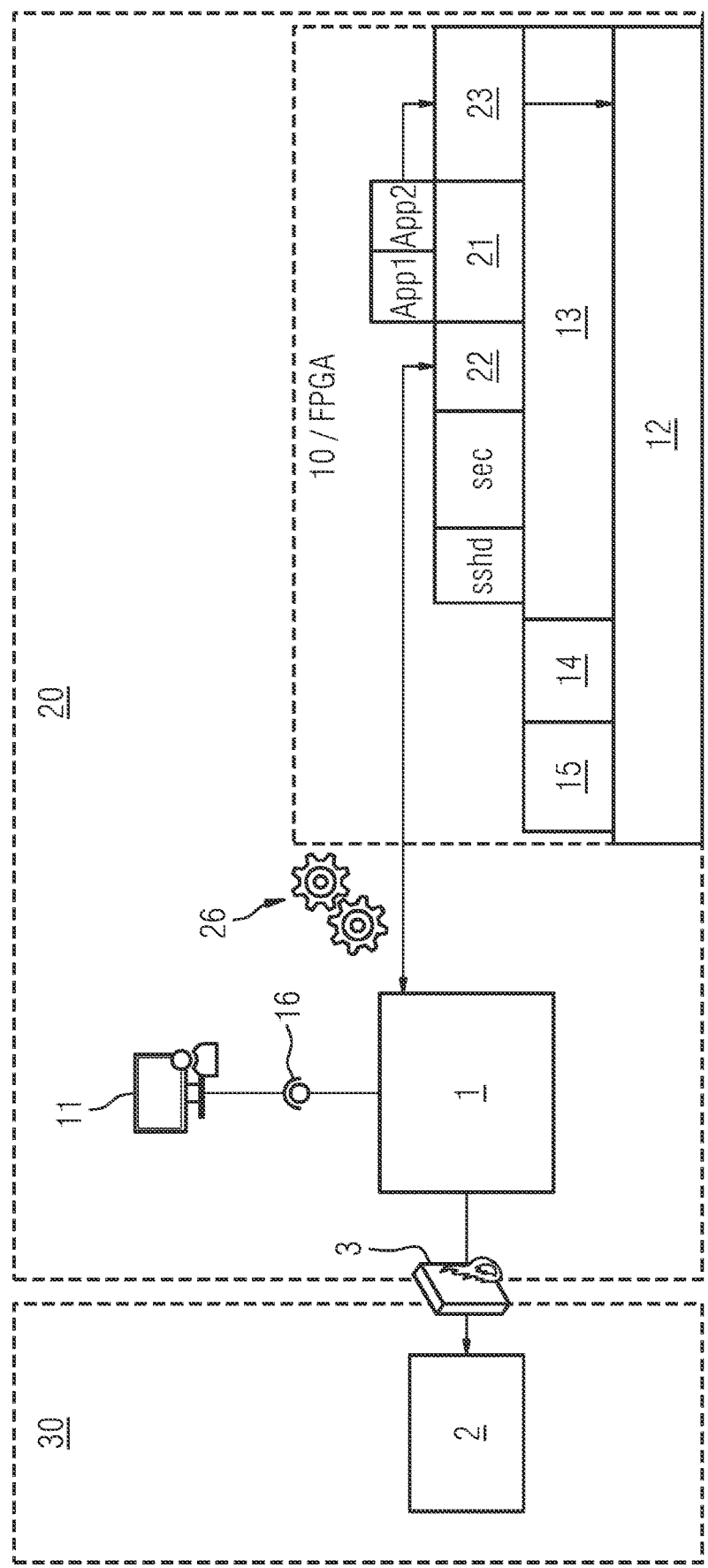
FIG. 4 illustrates the automatically configured computing device 10 operating.

FIG. 3 illustrates relevant modules and services for an automatic configuration of the container runtime environment 21 for a computing device 10. In an exemplary procedure, the process starts with the device management service 1 listening in the local network 20 for broadcasting messages 24 of new devices 10. If a new device 10 is discovered the device management service 1 automatically connects via ssh and factory default credentials to the new device 10 and starts device bootstrapping 25. Connection processes of any kind are presented by arrows in the figures.

The container runtime environment configuration 21 by the device management service 1 then comprises several steps. First, the device management service 1 downloads the device description 14 from the device 10 and creates new shopfloor-owner-specific 20 security certificates sec for the device 10 to enable secure communication. The device management service 1 closes the default Secure Shell Protocol (SSH, a cryptographic network protocol for operating network services securely over an unsecured network) services on the new device 1 and triggers a reboot of the device 10. Then, the device management service 1 reads the device description 14 from the device 10 to get its hardware 12 and software setup. The device management service 1 uses this information to identify the set of connectors 23 that are required for the container runtime environment 21 to be deployed on the device 10.

The device management service 1 has alternative options to obtain the required connectors 23 of the container runtime environment 21 to the device's capabilities. Either the device management 1 checks the system level repository for pre-defined connectors, such as connectors to communication protocols or to hardware like sensors and FPGAs. Or, if the repository service does not contain a required connector, the device manager 1 generates it automatically, if possible, based on the available device description 14. Automatic connector generation is generally possible for all "mapping" tasks, such as (field) communication protocol adaptation, e.g., from the container runtime communication protocol to Profibus or HART, or data format mappings, e.g., from the data formats used by containerized apps to the data formats required by the sensors and IOs of the device 10.

Using tools like Ansible and Puppet, the device management service 1 configures the container runtime environment 21 with the required connectors 23 and uploads it to and installs it on the device 10. The device manager 1 downloads and installs a node client 22 on the device 10 so that it can be monitored by the device management service 1 of the system. Once the device's configuration is completed, the device 10 operations phase 26 starts. After a reboot, the device 10 is connected to device manager service 1 and becomes accessible by a user, e.g. an operator. Operators use dashboard 11 to get an overview of the device 10. Operators can trigger deployment/update/deletion of containerized apps App1/App2 on the device 10 via the dashboard 11 and can start, suspend, resume, and stop their execution. The device 10 executes the deployed apps App1/App2.

DEFINITIONS

A net or network within the meaning of the present application may refer to any set of nodes which enables a plurality of participants to perform data communication with each other. The network may be a public network or a private network. The network may or may not be based on a blockchain platform. The network may be connected to at least one further network. The network may irreversibly process the data based on blockchain techniques.

A distributed network within the meaning of this application may refer to any database implemented in a network, which is at least partly stored redundantly on several network nodes remote from each other. Blockchain technology may comprise a plurality of blocks comprising data related to transactions and/or Smart Contracts. Chaining of different blocks may be implemented by cryptographic hash values stored in each block, wherein each hash value may refer to data of a previous block.

As used herein, the term computing system refers, for example, to a device, apparatus, or a plant. A computing system can, for example, be a field device. Preferably, the computing system comprises a plurality of hardware components and/or software components. Furthermore, the computing system can, for example, comprise at least one component having a communication interface configured to connect the inventive apparatus to an environment, user and/or other system.

Unless specifically stated otherwise, it is appreciated that throughout the specification discussions utilizing terms such as "processing", "computing", "computer-based", "calculating", "determining", "generating", "configuring" or the like, refer to the action and/or processes of a computer that manipulates and/or transforms data into other data, said data represented as physical, e.g. such as electronic, quantities. The term computing device should be expansively construed to cover any kind of electronic device with data processing capabilities, including, by way of non-limiting example, personal computers, servers, handheld computer systems, Pocket PC devices, Cellular communication device and other communication devices with computing capabilities, processors and other electronic computing devices.

The term evaluation in the context of this application means processing of observation data, created based on measurement configuration.

With the terms components or modules, here and in the following, the interface component, the task generation software component, the data storage components as well as other components referred to, may for example be software modules of a computer program for carrying out the computer-implemented method. Alternatively, the modules may correspond to respective hardware modules with software for carrying out the respective steps stored on them.

REFERENCES

1 Device management service/device manager, in particular edge-manager
11 Dashboard
2 Binary repository
3 Fire wall
10/FPGA Computing device, e.g. FPGA
sshd Open sshd package
12 Hardware
13 Firmware
14 Device specification
15 Network port
16 Terminal
20 local net, e.g. shopfloor, factory
21 Container runtime (environment)
22 Node client
sec Security certificates
23 Connectors
App1 containerized app on the device 10
App2 containerized app on the device 10
24 Broadcasting message
25 Bootstrap
26 Operate
30 onPremise/Cloud

The invention claimed is:
1. A method for automated configuration and/or integration of a joining computing device into a computing system, the method comprising:
   using a device management service to listen in a local distributed computing infrastructure for broadcasting messages from joining computing devices;
   automatically connecting using the device management service via secure shell (SSH) and factory default credentials to a discovered joining computing device;
   automatically configuring the joining computing device based on computer readable device descriptions, including:
      downloading a device description from the joining computing device;
      creating new security certificates for the joining computing device which enable secure communication;
      closing the default SSH services on the joining computing device and triggering a reboot of the joining computing device;

reading the device description from the joining computing device;

using the device description information to identify the set of connectors required for the container runtime environment to be deployed on the joining computing device, wherein individual connectors in the set of connectors connect to communication protocols, sensors, and/or field programmable gate arrays;

deploying the container runtime environment on the joining computer device; and executing containerized software in the deployed container runtime environment on the joining computer device.

2. A computer-implemented method according to claim 1, wherein the created security certificates are user-specific.

3. A computer-implemented method according to claim 1, wherein the device description from the joining computing device comprises hardware and software setup information.

4. A computer-implemented method according to claim 1, wherein the automated configuration further comprises obtaining the required connectors of the container runtime environment to the device's capabilities;

wherein the device management service checks the system level repository for pre-defined connectors.

5. A computer-implemented method according to claim 4, wherein the pre-defined connectors connect to communication protocols and/or to hardware.

6. A computer-implemented method according to claim 1, wherein the automated configuration further comprises automatically generating the required connector.

7. A computer-implemented method according to claim 6, wherein generating the required connector is based on the device description information.

\* \* \* \* \*